July 5, 1927. 1,634,651
W. COLCLOUGH
BRAKE ACTUATING MECHANISM FOR CENTRIFUGAL MACHINES
Filed July 3, 1922 2 Sheets-Sheet 1
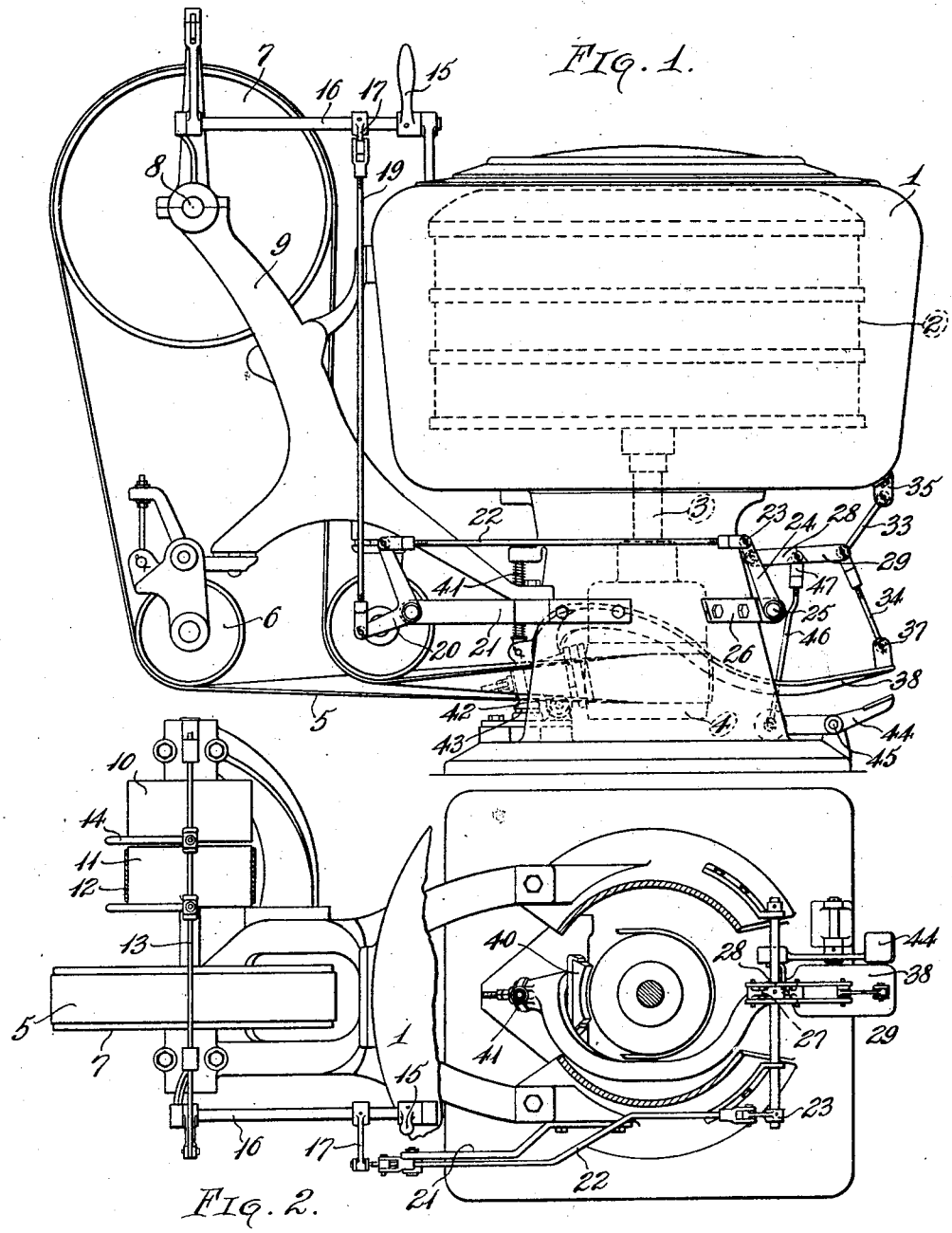
INVENTOR
William Colclough
BY Brockett & Hyde
ATTORNEYS

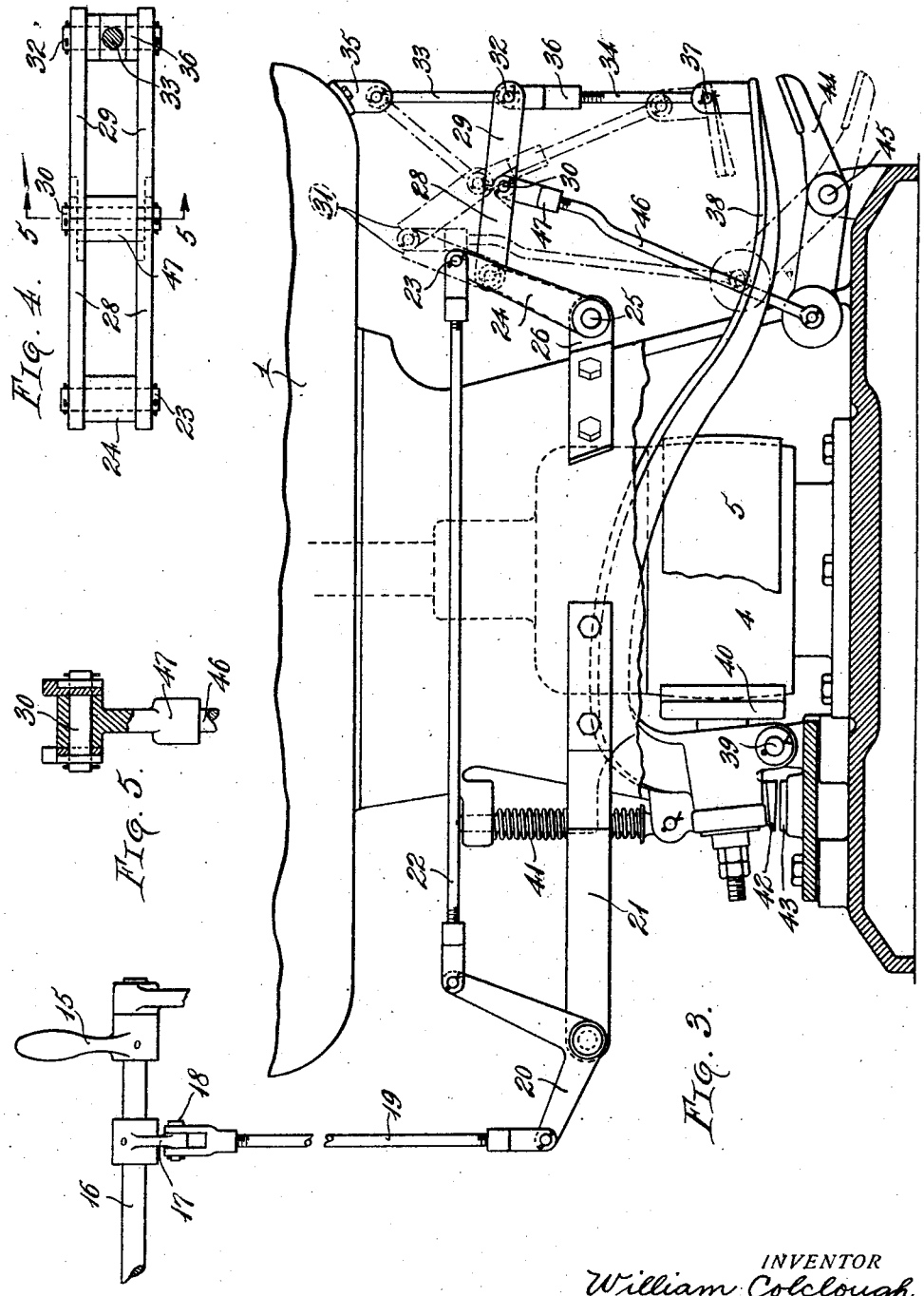

Patented July 5, 1927.

1,634,651

UNITED STATES PATENT OFFICE.

WILLIAM COLCLOUGH, OF NORWOOD, OHIO, ASSIGNOR TO THE AMERICAN LAUNDRY MACHINERY COMPANY, OF CINCINNATI, OHIO, A CORPORATION OF OHIO.

BRAKE-ACTUATING MECHANISM FOR CENTRIFUGAL MACHINES.

Application filed July 3, 1922. Serial No. 572,575.

This invention relates to improvements in centrifugal extractors.

The objects of this invention are to provide a centrifugal extractor with a shiftable belt drive connection together with means for automatically applying the brake so as to stop the basket upon shifting the belt from the fast to the loose pulley; to provide toggle lever mechanism which is adapted to be actuated for applying the brake to the rotatable basket upon shifting the belt from the fast to the loose pulley; to provide also means whereby the toggles can be broken by the operator independently of the belt shifting means so as to release the brake after the basket has been brought to still position for the purpose of permitting the basket to be rotated by the operator as may be necessary for unloading and reloading the same; and to provide means whereby the one toggle lever is straightened upon shifting the belt from the loose to the fast pulley so as to be set for actuation of another toggle lever which is adapted when so straightened to apply the brake to the spindle of the basket.

Other objects of the invention will be apparent from the following description and claims when considered together with the accompanying drawings.

Fig. 1 is a side elevation of my improved device; Fig. 2 is a plan view of the same with parts appearing in section; Fig. 3 is an enlarged elevation of the brake actuating mechanism with part of the base broken away; Fig. 4 is a plan view of the brake releasing toggle mechanism; and Fig. 5 is a section on line 5—5, Fig. 4.

The curb or casing 1 encloses the basket 2 which is mounted upon spindle 3 provided with the pulley 4 for operation by the belt 5. The belt 5 extends about the idlers 6 and the drive pulley 7 which is fixed upon a shaft 8 suitably mounted in the bracket arm 9 of the machine frame. Suitably mounted upon the shaft 8 are also the loose pulley 10 and the fast pulley 11 which are adapted to have the belt 12 shifted from one to the other according to whether or not the basket is to be operated. The belt 12 is shifted from one pulley to the other by means of the rod 13 provided with the fingers 14 as is well known in the art. The rod 13 is operated by means of the handle 15 fixed upon the shaft 16 suitably mounted in bracket arms upon the machine.

Fixed to the shaft 16 is the crank arm 17 which is pivotally connected at 18 with the rod 19. Rod 19 has pivotal connection with the one end of the bell crank lever 20 which is pivotally mounted upon the bracket arm 21 secured to the base of the machine. The other end of the bell crank lever 20 is pivoted to the clevis secured to the rod 22, the other end of which is also provided with a clevis having pivotal connection at 23 with an arm 24 secured upon the shaft 25 which is suitably mounted in the bracket 26. There is also fixed upon the shaft 25 a rock arm 27 which is pivoted at its upper end between the links 28 of a toggle lever the other links of which are indicated as 29. These two pairs of links are pivoted at the point 30 and are provided at their adjacent ends with the shoulders 31 so as to limit their straightening movement. The links 29 are pivotally connected at the point 32 to the joint of a toggle lever comprising the links 33 and 34. The link 33 is pivotally mounted at its upper end to the bracket 35 fixed upon the bottom of the curb 1 while the link 34 has screw thread adjustment in the clevis 36 and is pivotally connected at its other end at the point 37 to the brake lever 38. The brake lever, which extends about the drive pulley 4 of the basket spindle, is pivotally mounted at the point 39 to the base of the machine frame and carries the brake shoe 40, which is adapted to engage the pulley 4 for the purpose of stopping rotation of the basket upon depression of the treadle 38. The coil spring 41 which has abutment at its upper end against a bracket arm on the machine frame abuts at its lower end against the brake so as to normally tend to maintain the brake in released position. The brake is provided with the stop portion 42 adapted to engage the corresponding stop member 43 provided upon the base of the machine so as to limit the opening movement of the brake. The toggle link 44 is adjusted to proper length so as to insure contact between the stop portions 42 and 43 when the brake is released.

The release treadle 44 is pivotally mounted on the base of the machine at the point 45 and has pivotal connection at its one end with the rod 46. This rod carries the clevis member 47 which has pivotal connection at the point 30 with the toggle links which are adapted to be broken upon depression of the release treadle 44 for a purpose which will later appear.

With the parts in the position as illustrated in Figs. 1 and 2 the machine is in operation, that is to say, the basket is being driven by the belt 5 and the brake is in released position. When it is desired to stop rotation of the basket the lever 15 is manipulated by the operator so as to shift the belt 12 from the fast to the loose pulley. This manipulation at the same time causes the rod 19 to rise and through bell crank lever 20 to shift the rod 22 in a direction toward the right, as viewed in Fig. 3 of the drawing, with the result that the straightened toggle lever 28, 29 is moved in a straight line toward the right so as to straighten the toggle lever 33, 34 and depress the brake treadle 38 to apply the brake 40. Then with the basket in still position the operator by depressing release treadle 44 can break the toggle lever 28, 29 and hence break also the toggle lever 33, 34 independently of the belt shifting means. This arrangement will permit the operator to manually rotate the basket for purposes of unloading and reloading the same. Then when the basket is ready to be again set in operation the lever 15 is manipulated so as to shift the belt 12 to the fast pulley 11, which manipulation causes rod 19 to be depressed and through bell crank lever 20 causes rod 22 to move toward the left so as to straighten toggle lever 28, 29 which is thereby set in proper straightened position so as to straighten the toggle links 33, 34 when the belt is later shifted to the loose pulley.

It is also possible, with the toggles in the dotted line position shown in Fig. 3, to straighten the double toggle by depressing treadle 38, and in this way apply the brake and shift the belt to the idle pulley. Thus, by means of the particular mechanism here shown it is possible to disconnect the power and apply the brake both by the operation of either the lever 15 or the treadle 38.

What I claim is:

1. A centrifugal extractor, comprising a rotatable basket, a source of power for rotating the basket, means for operatively connecting said basket to and disconnecting the same from said source of power, means for effecting a braking action upon the basket, said two means being so interconnected that actuation of either will effect operation of both, and separate means for operating said braking means independently of said basket and power connecting and disconnecting means.

2. A centrifugal extractor comprising a rotatable basket, a source of power, a connecting means between said source of power and the basket, means for shifting the connecting means to active or idle position, an operator-operated brake for the basket, and means whereby the brake is automatically applied upon shifting the connecting means to idle position.

3. A centrifugal extractor comprising a rotatable basket, a source of power, a connecting means between said source of power and the basket, means for shifting the connecting means to active or idle position, an operator-operated brake for the basket, means whereby the brake is automatically applied upon shifting the connecting means to idle position, and means for releasing the brake.

4. A centrifugal extractor comprising a rotatable basket, a source of power, a connecting means between said source of power and the basket, means for shifting the connecting means to active or idle position, an operator operated brake for the basket, means whereby the brake is automatically applied upon shifting the connecting means to idle position, and means for releasing the brake independently of said shifting means.

5. A centrifugal extractor comprising a rotatable basket, a source of power, a connecting means between said source of power and the basket, means for shifting the connecting means to active or idle position, an operator-operated brake for the basket, means whereby the brake is automatically applied upon shifting the connecting means to idle position, and means for releasing the brake independently of said belt shifting means, said parts being so constructed and arranged that upon shifting the connecting means to active position the brake operating means will be set for actuation upon shifting the connecting means to idle position.

6. A centrifugal extractor, comprising a rotatable basket, a source of power for rotating the basket, means for operatively connecting said basket to and disconnecting the same from said source of power, and means controlled by the disconnection of said basket from the source of power for effecting a braking action upon the basket operating means, said last named means being automatically set for such braking action upon connection of said basket with the source of power.

7. A centrifugal extractor, comprising a rotatable basket, a source of power for rotating the basket, means for operatively connecting said basket to and disconnecting the same from said source of power, means for effecting a braking action upon the basket, and lever connections between said two means whereby operation of either of said means will effect operation of both of said means 8. A centrifugal extractor, comprising a rotatable basket, a source of power for rotating the basket, means for operatively connecting said basket to and disconnecting the same from said source of power, means for effecting a braking action upon the basket, and toggle lever connections between said two means whereby operation of either of said means will effect operation of both of said means.

9. A centrifugal extractor comprising a rotatable basket, a source of power for rotating the basket, means for operatively connecting said basket to and disconnecting the same from said source of power, a brake for the basket, and toggle means for operating the brake, said toggle means being under control of said power connecting and disconnecting means.

10. A centrifugal extractor comprising a rotatable basket, a source of power for rotating the basket, means for operatively connecting said basket to and disconnecting the same from said source of power, a brake for the basket, a toggle lever for applying the brake, a second toggle lever for actuating said first toggle lever, means for actuating said toggles upon disconnecting the source of power, and means for breaking said toggles to release the brake so as to release the basket after stopping the same.

11. A centrifugal extractor comprising a rotatable basket, a source of power for rotating the basket, means for operatively connecting said basket to and disconnecting the same from said source of power, a brake for the basket, a toggle lever for applying the brake, a second toggle lever for actuating said first toggle lever, means for actuating said toggles upon disconnecting the source of power, means for breaking said toggles to release the brake so as to release the basket after stopping the same, and means for straightening said second toggle upon connecting the basket to the source of power so as to set the same for straightening the first toggle lever upon disconnecting the basket from the source of power.

12. A centrifugal extractor, comprising a rotatable basket, a source of power for rotating the basket, means for operatively connecting said basket to and disconnecting the same from said source of power, means for effecting a braking action upon the basket, a double toggle lever connecting said two means whereby connection of the basket to said source of power will automatically straighten one of the toggles preparatory to straightening the other toggle when the power is disconnected.

13. A centrifugal extractor, comprising a rotatable basket, a source of power for rotating the basket, means for operatively connecting said basket to and disconnecting the same from said source of power, means for effecting a braking action upon the basket, a double toggle lever connecting said two means whereby said braking action can be applied either by operation of the braking means by the operator or automatically by connection of the basket with the source of power.

14. A centrifugal extractor, comprising a rotatable basket, a source of power for rotating the basket, means for operatively connecting said basket to and disconnecting the same from said source of power, operator-operated means for effecting a braking action upon the basket, and means whereby direct actuation of said braking means will automatically disconnect the basket from the source of power.

15. A centrifugal extractor, comprising a rotatable basket, a source of power for rotating the basket, means for operatively connecting said basket to and disconnecting the same from said source of power, means for effecting a braking action upon the basket, means tending normally to release said braking action, means controlled by the disconnection of said basket from the source of power for effecting a braking action upon the basket, and means for releasing said braking action independently of said power connection.

In testimony whereof I hereby affix my signature.

WILLIAM COLCLOUGH.

CERTIFICATE OF CORRECTION.

Patent No. 1,634,651. Granted July 5, 1927, to

WILLIAM COLCLOUGH.

It is hereby certified that error appears in the printed specification of the above numbered patent requiring correction as follows: Page 2, line 101, claim 5, strike out the word "belt"; and that the said Letters Patent should be read with this correction therein that the same may conform to the record of the case in the Patent Office.

Signed and sealed this 30th day of August, A. D. 1927.

Seal.

M. J. Moore,
Acting Commissioner of Patents.